United States Patent
Chung et al.

(10) Patent No.: US 9,067,813 B2
(45) Date of Patent: Jun. 30, 2015

(54) FORMING MOLD AND RELATED FORMING DEVICE AND FORMING METHOD USING SAME

(71) Applicant: G-TECH Optoelectronics Corporation, Miaoli County (TW)

(72) Inventors: Chih-Ming Chung, Miaoli (TW); Jung-Pin Hsu, Miaoli (TW); Tai-Hua Lee, Miaoli (TW); Chao-Hsien Lee, Miaoli (TW)

(73) Assignee: G-TECH Optoelectronics Corporation, Miaoli County (TW)

( * ) Notice: Subject to any disclaimer, the term of this patent is extended or adjusted under 35 U.S.C. 154(b) by 55 days.

(21) Appl. No.: 13/714,571

(22) Filed: Dec. 14, 2012

(65) Prior Publication Data

US 2014/0026618 A1    Jan. 30, 2014

(30) Foreign Application Priority Data

Jul. 27, 2012    (TW) .............................. 101127293 A

(51) Int. Cl.
  *C03B 11/07*    (2006.01)
  *C03B 23/035*   (2006.01)
  *B29C 51/36*    (2006.01)

(52) U.S. Cl.
  CPC ............. *C03B 11/07* (2013.01); *C03B 2215/03* (2013.01); *C03B 2215/07* (2013.01); *C03B 2215/41* (2013.01)

(58) Field of Classification Search
  CPC   C03B 2215/07; C03B 11/07; C03B 23/0357; C03B 2215/50; B29C 33/3814; B29C 51/365

USPC ........................................................... 65/287
See application file for complete search history.

(56) References Cited

U.S. PATENT DOCUMENTS

| | | | | |
|---|---|---|---|---|
| 3,353,219 | A * | 11/1967 | Snyder ........................ | 425/405.1 |
| 4,714,424 | A * | 12/1987 | Kinugasa et al. ............. | 425/388 |
| 4,781,569 | A * | 11/1988 | Kinugasa et al. ............. | 425/504 |
| 5,383,947 | A   | 1/1995  | Montonen | |
| 5,653,779 | A   | 8/1997  | Saito et al. | |
| 5,989,492 | A * | 11/1999 | Larsson .......................... | 419/36 |
| 2004/0020244 | A1* | 2/2004 | Kramer et al. .................. | 65/106 |

(Continued)

FOREIGN PATENT DOCUMENTS

TW    201226343 A1    7/2012
TW    201313632 A1    4/2013

OTHER PUBLICATIONS

Mersen, "Specialty Graphite Materials", https://www.mersen.com/uploads/tx_mersen/6-continuous-casting-mersen_06.pdf, Accessed Nov. 25, 2014.*

*Primary Examiner* — Cynthia Szewczyk
(74) *Attorney, Agent, or Firm* — Novak Druce Connolly Bove + Quigg LLP

(57) ABSTRACT

A forming mold made from a polyporous refractory material is provided for forming a glass piece. The forming mold includes an outer surface and a plurality of forming structures provided on the outer surface. Each of the forming structures includes a forming surface matching with a shape of the glass piece. The forming mold is structured and arranged to be pumped down from the outer surface to generated an absorption force on molten glass material provided at the at least one forming surface for sucking the molten glass material on the forming structure to form the glass piece.

16 Claims, 7 Drawing Sheets

(56) References Cited

U.S. PATENT DOCUMENTS

| | | | |
|---|---|---|---|
| 2005/0241815 A1* | 11/2005 | Caze et al. | 165/170 |
| 2006/0162385 A1 | 7/2006 | Yamanaka et al. | |
| 2008/0093753 A1* | 4/2008 | Schuetz | 264/1.9 |
| 2008/0230951 A1* | 9/2008 | Dannoux et al. | 264/293 |

* cited by examiner

FORMING MOLD AND RELATED FORMING DEVICE AND FORMING METHOD USING SAME

BACKGROUND

1. Technical Field

The present disclosure relates to product forming technologies, and more particularly, to a forming mold for molding a glass enclosure and a related forming device and forming method.

2. Description of Related Art

A typical device for forming glass includes an upper mold and a lower mold cooperating with the upper mold. Glass material is placed on the lower mold. The upper mold then punches the glass material on the lower mold to form a glass enclosure. However, the structure of the glass forming device having the upper mold and the lower mold is very complicated and costly.

Therefore, it is desirable to provide a forming mold and a related forming device and forming method which can overcome the above-mentioned problems.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views, and all the views are schematic.

DETAILED DESCRIPTION

Embodiments of the present disclosure will now be described in detail below, with reference to the accompanying drawings.

Figure 1:
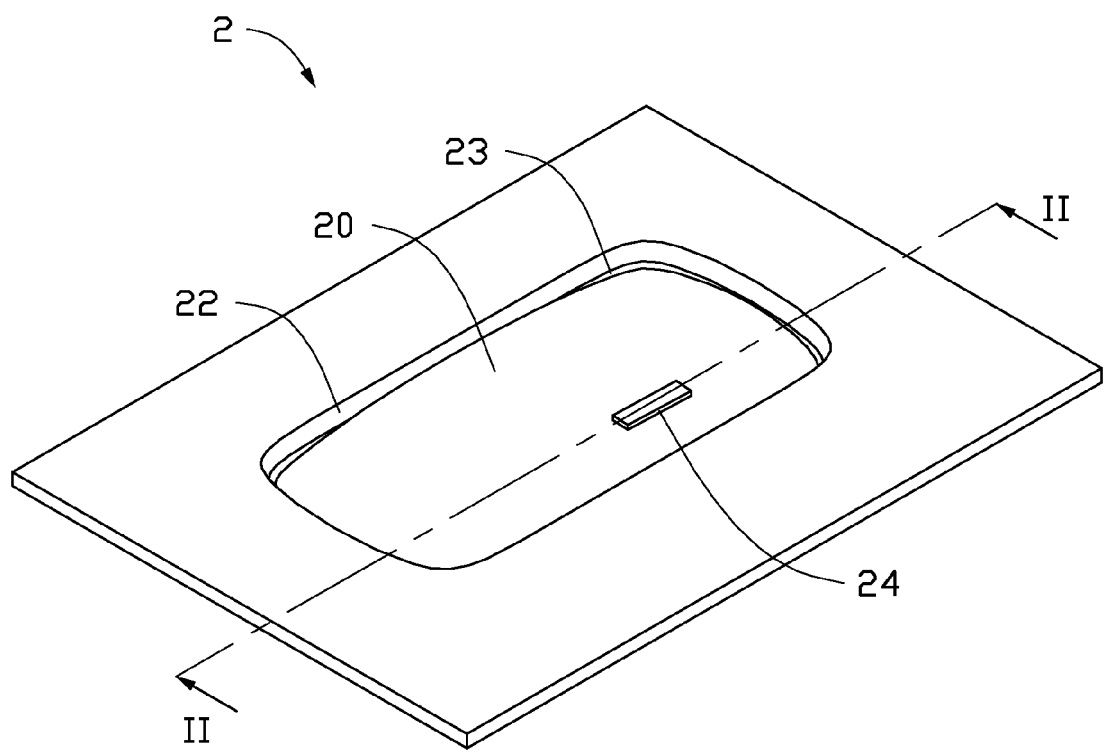
FIG. 1 is a simplified, isometric view of an uncut glass enclosure formed by a forming device, according to an exemplary embodiment.
Figure 2:
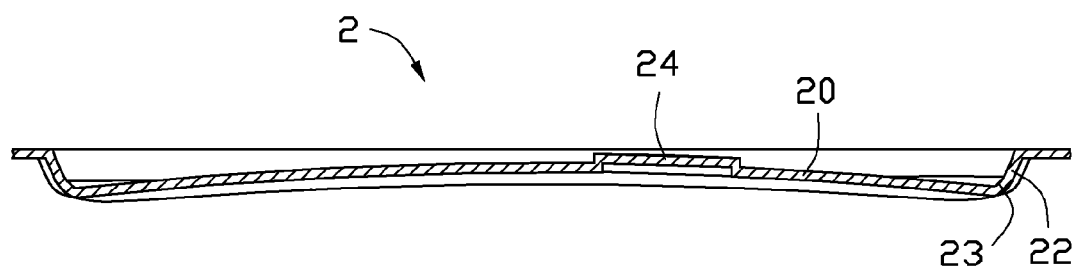
FIG. 2 is a cross-sectional view taken along part of line II-II of FIG. 1, showing the glass enclosure after it has been cut.
Figure 3:
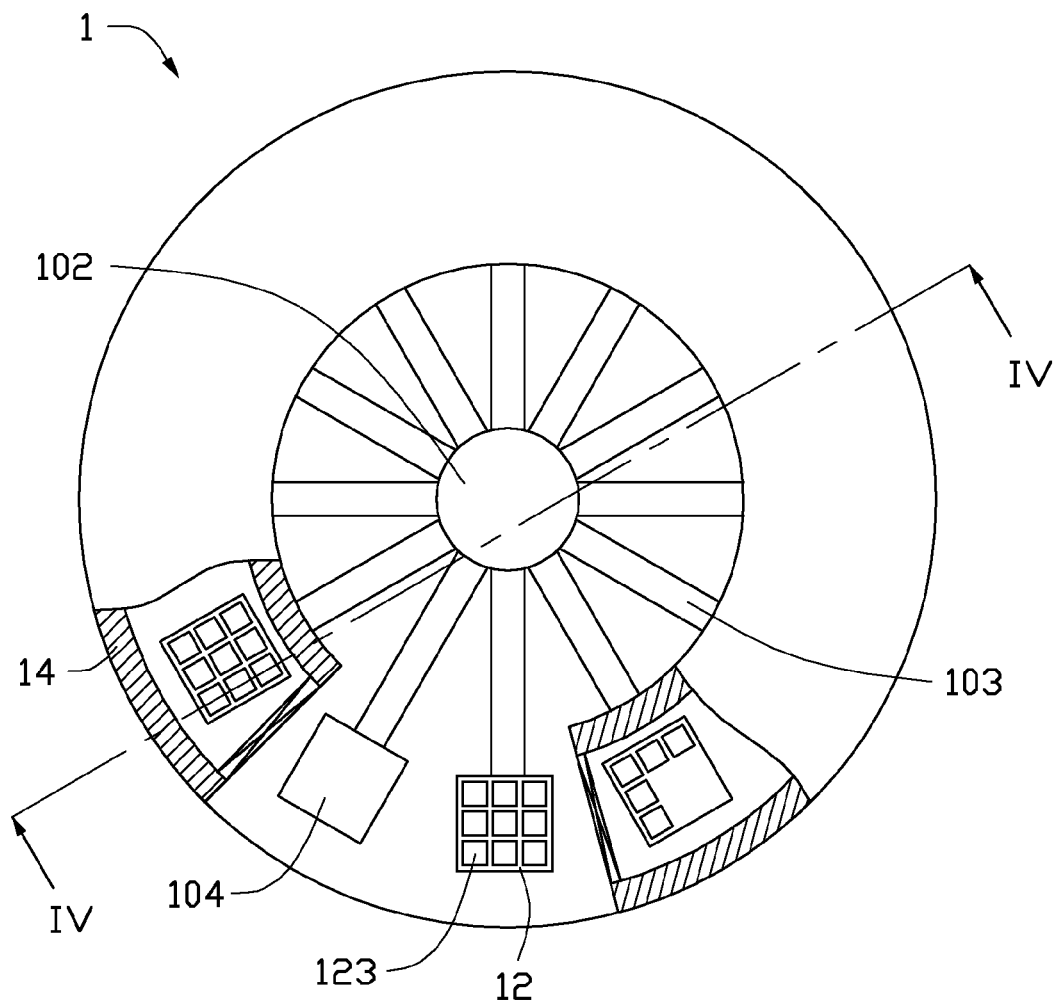
FIG. 3 is a top plan, cutaway view of the forming device, which includes a plurality of forming molds.
Figure 4:
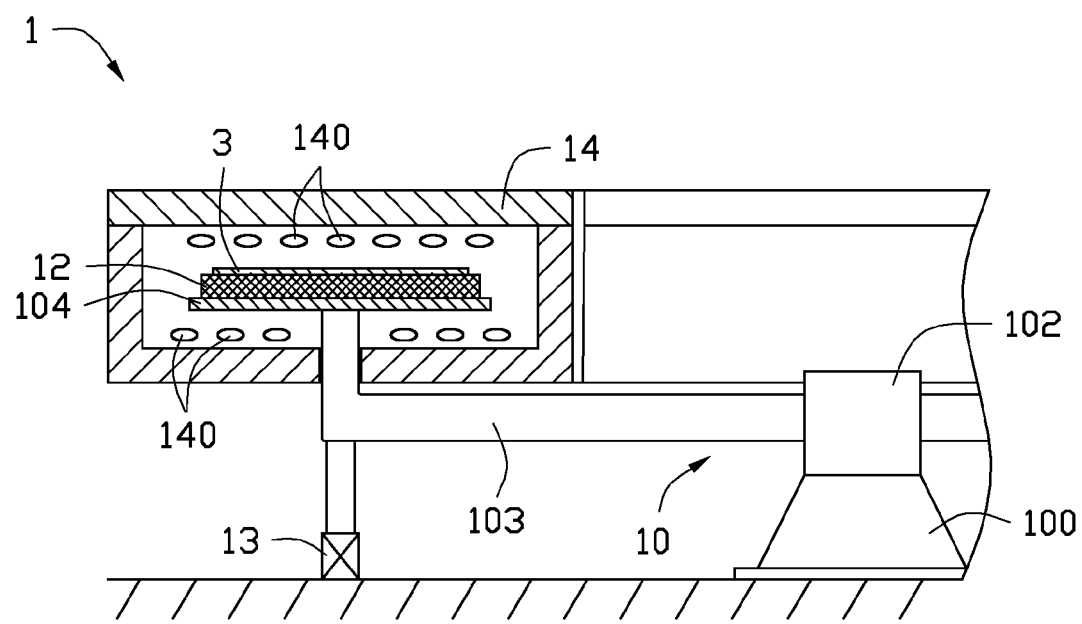
FIG. 4 is an enlarged, simplified, side cutaway view of part of the forming device of FIG. 3, corresponding to line IV-IV thereof, and showing glass material placed on one of the forming molds, the forming mold held on a holder.
Figure 5:
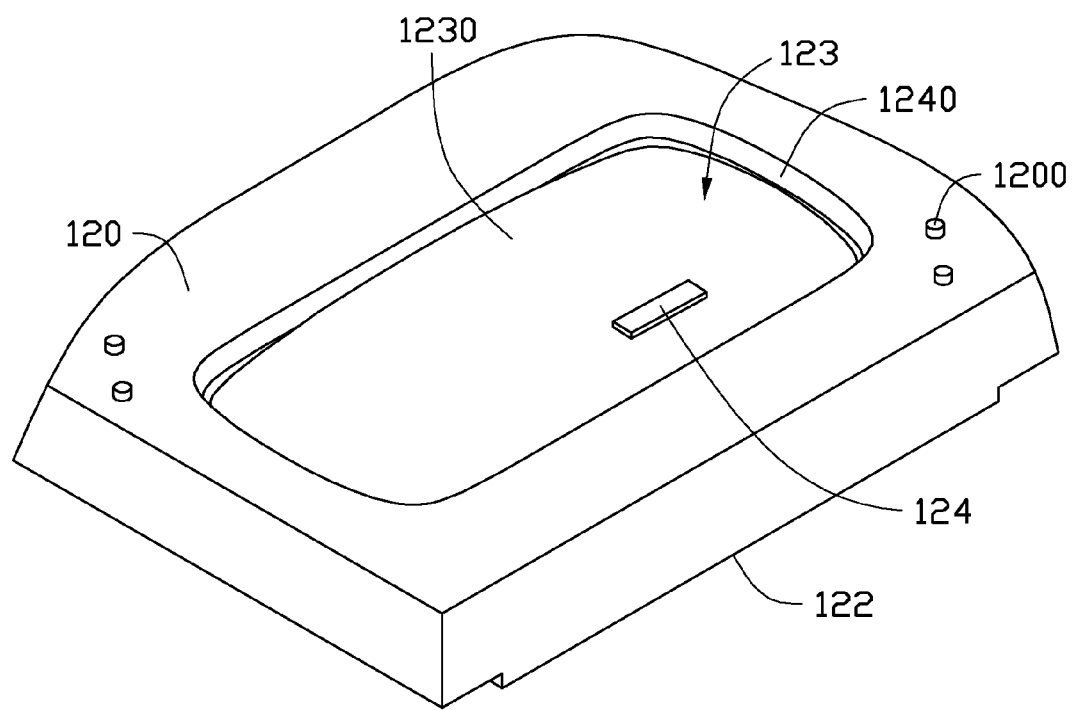
FIG. 5 is an enlarged, isometric view of part of one of the forming molds of FIG. 3, showing one of forming structures of the forming mold, the forming structure corresponding to the uncut glass enclosure of FIG. 1.

FIGS. 3 and 4 illustrate a forming device 1 in accordance with an exemplary embodiment. The forming device 1 is configured for forming a plurality of enclosures. Referring also to FIGS. 1 and 2, in the present embodiment, the forming device 1 is configured for forming a plurality of glass enclosures 2. FIG. 1 shows a raw glass enclosure 2 before its periphery has been cut, and FIG. 2 shows the cut glass enclosure 2. Each glass enclosure 2 includes a bottom board 20, a peripheral side wall 22, and a peripheral connecting portion 23 connecting the side wall 22 with a periphery of the bottom board 20. In the present embodiment, the bottom board 20 is slightly convex, the side wall 22 has a low profile and is slightly concave, and the peripheral connecting portion 23 is concave. In particular, the connecting portion 23 is substantially a smoothly curved chamfer (or fillet). Thus any inner surface portion of the glass enclosure 2 running from a bottom of the side wall 22 to the connecting portion 23 to the periphery of the bottom board 20 is smoothly curved. A radius of curvature of the connecting portion 23 is greater than or equal to 0.02 mm (millimeters) and less than or equal to 5 mm. The included angle from the bottom board 20 to the side wall 22 is greater than or equal to 90 degrees and less than or equal to 110 degrees.

A number of microstructures 24 are formed on the bottom board 20. In FIGS. 1 and 2, for simplicity, only one of the microstructures 24 is shown. The microstructures 24 may be decorative patterns or characters, for example. In the illustrated embodiment, the microstructures 24 are in the form of elongated protrusions. The transverse width of each of the microstructures 24 is greater than or equal to 0.18 mm and less than or equal to 2 mm.

When the glass enclosure 2 is applied to an apparatus such as a portable electronic device, the bottom board 20 may be used for protecting a main surface of the apparatus, while the side wall 22 may be used for protecting a peripheral side surface of the apparatus.

Referring to FIGS. 3 and 4, the forming device 1 may include a transmission mechanism 10, at least one forming mold 12, a chamber environment controller 13, at least two forming chambers 14, and at least two temperature regulators 140. In the illustrated embodiment, there is a plurality of forming molds 12. A glass material 3 is placed on (or in) each of the forming molds 12. The forming chambers 14 are arranged one by one along a predetermined path. In the illustrated embodiment, the predetermined path is circular. It is understood that the predetermined path can instead be a straight path or a rectangular path, for example. Each of the forming chambers 14 is a confined space. During a forming process, the forming molds 12 which hold the glass material 3 are brought into different forming chambers 14 by the transmission mechanism 10. The chamber environment controller 13 is connected to one or more specified forming chambers 14, to regulate an operation environment in each of such forming chambers 14. For example, the chamber environment controller 13 may regulate the air pressure and/or the gas composition in each of such forming chambers 14.

The transmission mechanism 10 includes a base 100, a rotator 102, a number of support arms 103, and a number of holders 104. The rotator 102 is rotatably connected to the base 100. The support arms 103 connect to a periphery of the rotator 102, and are arranged radially around the rotator 102. In this embodiment, the support arms 103 are arranged around a center of the rotator 102 at equal angular intervals. Each holder 104 is positioned at a distal end of a respective support arm 103.

Figure 6:
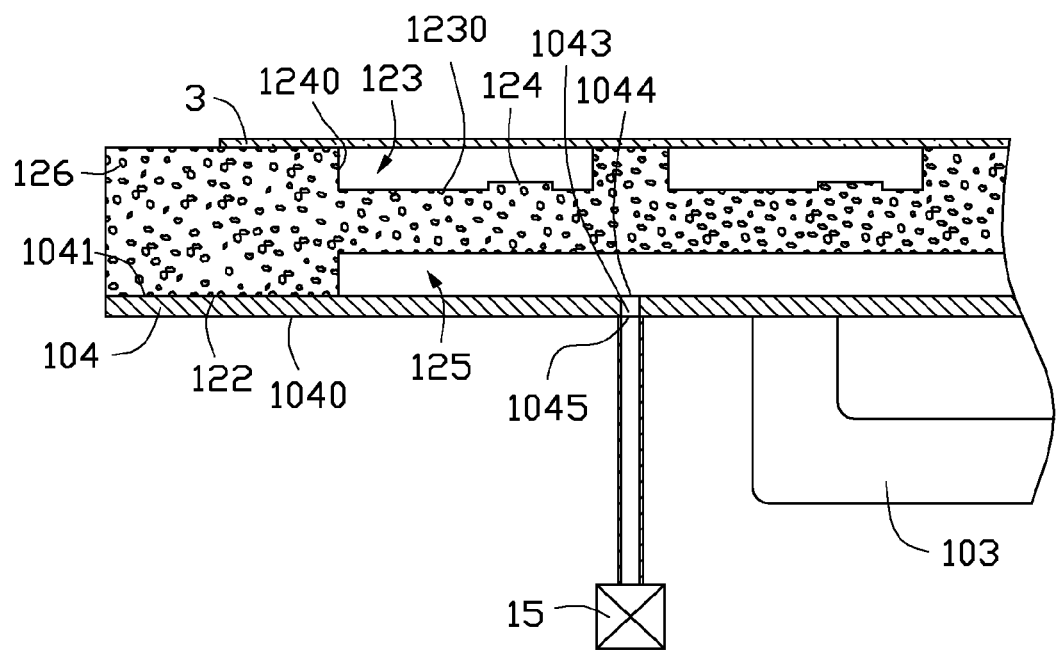
FIG. 6 is essentially an enlarged, simplified view of part of the glass material, the forming mold and the holder of FIG. 4.

FIGS. 4 and 6 show one of the holders 104 of the embodiment. Each holder 104 includes a bottom surface 1040 connected to the support arm 103, a top surface 1041 parallel to the bottom surface 1040, and a number of apertures 1043 passing through the top surface 1041 and the bottom surface 1040. Each of the apertures 1043 defines a top opening 1044 at the top surface 1041 and a bottom opening 1045 at the bottom surface 1040.

Each forming mold 12 includes a first surface 120, and a second surface 122 opposite to the first surface 120. A number of forming structures 123 are formed on (or in) the first surface 120. In the illustrated embodiment, there are nine forming structures 123, which are arranged in a 3×3 array (or matrix). The shape of each forming structure 123 matches with the shape of one glass enclosure 2 needing to be formed. Each forming structure 123 includes a first forming surface 1230, a peripheral second forming surface 1240 approximately perpendicular to the first forming surface 1230, and a number of micro-protrusions 124 formed on the first forming surface 1230 for forming the microstructures 24. In FIG. 6, for simplicity, only one of the micro-protrusions 124 is shown. In this embodiment, the forming structure 123 is in the shape of an approximately rectangular groove overall. The first forming surface 1230 is an inner bottom surface of the groove. The second forming surface 1240 is an inner peripheral side surface of the groove. In other embodiments, the forming structure 123 is in the shape of an approximately rectangular protrusion overall. In such case, the first forming surface 1230 is an outer top surface of the protrusion, and the second forming surface 1240 is an outer side surface of the protrusion.

The forming mold 12 defines a gas channel 125 on the second surface 122 thereof. When the forming mold 12 is placed on (or in) the holder 104, the second surface 122 contacts the top surface 1041 of the holder 104, and the gas channel 125 communicates with the top opening 1044. A number of positioning structures 1200 are formed on the first surface 120, for fastening the glass material 3 thereon. In the illustrated embodiment, the positioning structures 1200 are in the form of pins. Four positioning structures 1200 are provided for each forming structure 123. Two of the positioning structures 1200 are at one corner of the forming structure 123, and the other two positioning structures 1200 are at a diagonally opposite corner of the forming structure 123.

The forming mold 12 is made from a polyporous refractory material which may be selected from a group consisting of hexagonal boron nitride (HBN), silicon dioxide ($SiO_2$), aluminum oxide ($Al_2O_3$), carbon having a hexagonal system, and compounds thereof, for example. The density of the forming mold 12 is greater than or equal to 1.5 $g/cm^3$ (grams per cubic centimeter) and less than or equal to 6.5 $g/cm^3$. The melting point of the forming mold 12 is greater than or equal to 1600° C. (degrees centigrade). An interior of the forming mold 12 forms a multiplicity of micro-cavities 126 communicating with each other. The micro-cavities 126 are randomly yet substantially evenly distributed in the interior of the forming mold 12 and at the outer surface of the forming mold 12. In addition, the micro-cavities 126 are relatively compactly distributed. The radiuses of the micro-cavities 126 are in the approximate range of greater than or equal to 0.2 nm (nanometers) to less than or equal to 2 μm (micrometers). Thus, the forming mold 12 is well ventilated.

Figure 7:
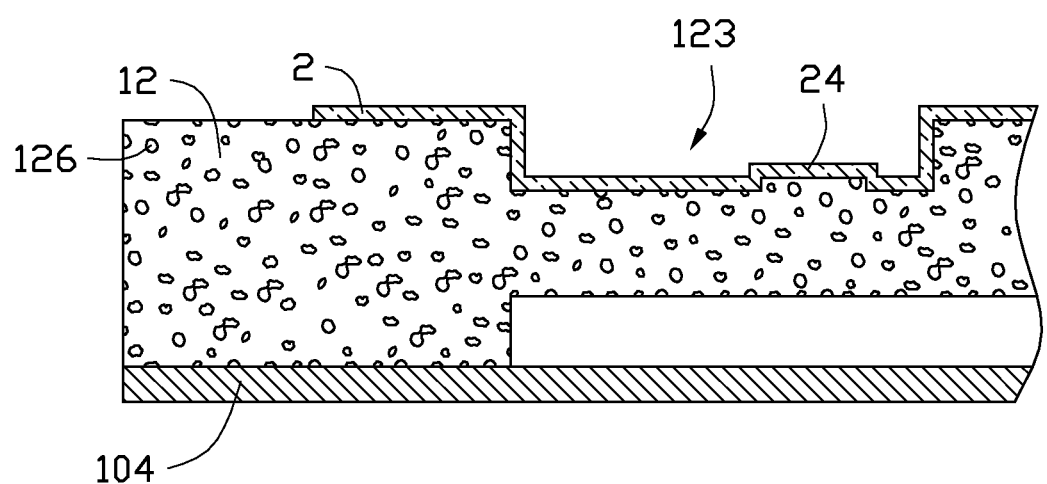
FIG. 7 is similar to an enlarged view of part of FIG. 6, but showing the glass material having been melted and sucked down onto one forming structure of the forming mold thereby forming an uncut glass enclosure (such as the one of FIG. 1).

Referring to FIGS. 6 and 7, in use of each forming mold 12, the bottom opening 1045 is connected to a vacuum pump 15. The forming mold 12 is pumped down via the communication of the gas channel 125, the top opening 1044, and the bottom opening 1045. The micro-cavities 126 on the first forming surface 1230 and the second forming surface 1240 generate an even negative pressure difference to suck the molten glass material 3 onto the forming structure 123 to form the uncut glass enclosure 2 with a predetermined shape. In this description, unless the context indicates otherwise, a reference to "molten" glass material 3 or similar reference means glass material 3 that has reached at least its glass transition temperature. Because the micro-cavities 126 are substantially evenly and compactly distributed in the forming mold 12, a strong and substantially even absorption force caused by the negative pressure difference is generated on the first forming surface 1230 and the second forming surface 1240 when the forming mold 12 is pumped down. The molten glass material 3 is then bent and tightly attached on the forming structure 123 by the absorption force to form very sharp internal corners and the very detailed microstructures 24. For example, the glass enclosure 2 thus formed may include the microstructures 24 each being in the form of the elongated protrusion with the minimum width of 0.18 mm. In addition, because the absorption force on the first forming surface 1230 and the second forming surface 1240 is very even, the outer surface of the glass enclosure 2 made by the forming mold 12 is evenly formed. That is, the outer surface of the glass enclosure 2 is very smooth and substantially without any defects.

Referring to FIGS. 3 and 4, the forming chambers 14 are continuously connected in order. The temperature regulators 140 are set in the specific forming chambers 14 corresponding to the forming steps at which the temperature needs to be changed. Each of the temperature regulators 140 can be an infrared heater or an induction heater. In this embodiment, the connected forming chambers 14 cooperatively form an annular arrangement. The rotator 102 rotates around its central axis so that the support arms 103 drive the forming molds 12 on the holders 104 to travel among the different forming chambers 14.

An exemplary embodiment of a forming method for forming a plurality of the glass enclosures 2 is provided. Depending on the embodiment, additional steps may be added, other deleted, and the ordering of the steps may be changed.

In step S801, a plurality of the forming molds 12 made from polyporous refractory material is provided on the transmission mechanism 10. The forming structures 123 are provided on each of the forming molds 12. The glass material 3 is placed on (or in) the forming structures 123 of each forming mold 12. A thickness of the glass material 3 is greater than or equal to 0.3 mm and less than or equal to 40 mm.

In step S802, the forming molds 12 with the glass material 3 placed thereon (or therein) are driven to travel through the different forming chambers 14 by the transmission mechanism 10. Thereby, the glass material 3 is stepwise heated to a melted state in the different forming chambers 14. The internal temperature of each forming chamber 14 is regulated to a predetermined value by the corresponding temperature regulators 140. Each of the forming molds 12 stays in each forming chamber 14 for a predetermined time, and the glass material 3 of each forming mold 12 is thus stepwise heated to the melted state in the different forming chambers 14. For example, the glass material 3 is heated to 1200° C. in three forming chamber 14 in sequence. In the first forming chamber 14, the glass material 3 is heated to 400° C. for one hour. In the second forming chamber 14, the glass material 3 is continuous to be heated to 800° C. for one hour. Finally, the glass material 3 is taken into the third forming chamber 14 and heated to 1200° C. for one hour. In the heating process for each forming chamber 14, air is pumped out of the forming chamber 14 and an inert gas, for example, helium, neon, or argon, is filled back into the forming chamber 14, in order to avoid the forming mold 12 and the glass material 3 being rapidly oxidized.

In step S803, when the glass material 3 is heated to a melted state, the forming mold 12 containing such glass material 3 is pumped down by the vacuum pump 15. The molten glass material 3 is sucked on the forming structures 123 via the absorption force generated by the micro-cavities 126 of the forming mold 12. Thus, the glass material 3 is bent to form a plurality of preforms of the glass enclosures 2 each with the specified shape.

In step S804, the forming molds 12 with the formed glass material 3 placed thereon (or therein) are continuously driven to travel through the different forming chambers 14 by the transmission mechanism 10, and the formed glass material 3 is thereby cooled to ambient temperature. In the cooling process of each forming mold 12, the cooling rate of the glass material 3 is faster than the cooling rate of the forming mold 12. Thus the glass material 3 separates from the forming structures 123, and is easily taken out of the forming mold 12.

In step S805, the cooled glass material 3 is taken out of each forming mold 12. Typically, the cooled glass material 3 then undergoes a further reinforcing treatment such as annealing or tempering. Finally, the processed glass material 3 is cut into a number of glass enclosures 2. In the present embodiment, the processed glass material 3 yields nine glass enclosures 2.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A forming mold for forming a glass piece, the forming mold comprising:
   an outer surface; and
   a forming structure provided at the outer surface;
   wherein the forming mold is made from a polyporous refractory material, the forming structure comprises at least one forming surface matching with a shape of the glass piece, the forming mold defines a plurality of micro-cavities communicating with each other in interior of the forming mold and the outer surface of the forming mold, the micro-cavities are evenly and compactly distributed in the forming mold, and the forming mold is structured and arranged to be pumped down from the outer surface to generate an absorption force on molten glass material provided at the at least one forming surface for sucking the molten glass material on the forming structure to form the glass piece.

2. The forming mold of claim 1, wherein the polyporous refractory material is selected from a group consisting of hexagonal boron nitride, silicon dioxide, aluminum oxide, carbon having a hexagonal system, and compound thereof.

3. The forming mold of claim 1, wherein the density of the forming mold is greater than or equal to 1.5 grams per cubic centimeter ($g/cm^3$) and less than or equal to 6.5 $g/cm^3$.

4. The forming mold of claim 1, wherein the melting point of the forming mold is greater than or equal to 1600° C. (degree centigrade).

5. The forming mold of claim 1, wherein the radiuses of the micro-cavities are greater than or equal to 0.2 nm and less than or equal to 2 μm.

6. The forming mold of claim 1, wherein the at least one forming surface comprises a first forming surface and a second forming surface perpendicular to the first forming surface.

7. The forming mold of claim 6, wherein each of the forming structures is a rectangular groove, the first forming surface is an inner bottom surface of the groove, and the second forming surface is an inner side surface of the groove.

8. The forming mold of claim 6, wherein each of the forming structures is a rectangular protrusion, the first forming surface is an outer top surface of the protrusion, and the second forming surface is an outer side surface of the protrusion.

9. A forming device for forming a glass piece, the forming device comprising:
   at least two forming chambers connected one by one along a predetermined path;
   a forming mold;
   a vacuum pump operatively connected to the forming mold; and
   a transmission mechanism configured to transmit the forming mold through the different forming chambers along the predetermined path;
   wherein the forming mold is made from a polyporous refractory material and comprises an outer surface and a forming structure provided at the outer surface, the forming structure comprises at least one forming surface, the forming mold defines a plurality of micro-cavities communicating with each other in interior of the forming mold and the outer surface of the forming mold, the micro-cavities are evenly and compactly distributed in the forming mold, the vacuum pump is configured to pump down the forming mold to generate an absorption force on molten glass material provided at the at least one forming surface for sucking the molten glass material on the forming structure to form the glass piece.

10. The forming device of claim 9, wherein the polyporous refractory material is selected from a group consisting of hexagonal boron nitride, silicon dioxide, aluminum oxide, carbon having a hexagonal system, and compound thereof.

11. The forming device of claim 9, wherein the density of the forming mold is greater than or equal to 1.5 grams per cubic centimeter ($g/cm^3$) and less than or equal to 6.5 $g/cm^3$.

12. The forming device of claim 9, wherein the melting point of the forming mold is greater than or equal to 1600° C. (degree centigrade).

13. The forming device of claim 9, wherein the radiuses size of the micro-cavities are greater than or equal to 0.2 nm and less than or equal to 2 μm.

14. The forming device of claim 9, wherein the at least one forming surface comprises a first forming surface and a second forming surface perpendicular to the first forming surface.

15. The forming device of claim 14, wherein each of the forming structures is a rectangular groove, the first forming surface is an inner bottom surface of the groove, and the second forming surface is an inner side surface of the groove.

16. The forming device of claim 14, wherein each of the forming structures is a rectangular protrusion, the first forming surface is an outer top surface of the protrusion, and the second forming surface is an outer side surface of the protrusion.

* * * * *